(12) United States Patent
Amidei et al.

(10) Patent No.: US 11,765,410 B2
(45) Date of Patent: *Sep. 19, 2023

(54) SYNCHRONIZING MULTIPLE OVER THE TOP STREAMING CLIENTS

(71) Applicant: DIVX, LLC, San Diego, CA (US)

(72) Inventors: William David Amidei, San Diego, CA (US); Jason Braness, San Diego, CA (US)

(73) Assignee: DIVX, LLC, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/653,605

(22) Filed: Mar. 4, 2022

(65) Prior Publication Data

US 2022/0264161 A1  Aug. 18, 2022

Related U.S. Application Data

(63) Continuation of application No. 16/729,102, filed on Dec. 27, 2019, now Pat. No. 11,272,232, which is a
(Continued)

(51) Int. Cl.
*H04N 21/43* (2011.01)
*H04N 21/2387* (2011.01)
(Continued)

(52) U.S. Cl.
CPC ......... *H04N 21/2387* (2013.01); *H04L 7/00* (2013.01); *H04L 7/0008* (2013.01); *H04L 65/61* (2022.05);
(Continued)

(58) Field of Classification Search
CPC ......... H04L 7/00; H04L 7/0008; H04L 65/61; H04L 65/70; H04L 65/764; H04L 65/80;
(Continued)

(56) References Cited

U.S. PATENT DOCUMENTS 5,400,401 A   3/1995  Wasilewski et al.
5,574,785 A  11/1996  Ueno et al.
(Continued)

FOREIGN PATENT DOCUMENTS

CA   2237293 A1   7/1997
CN  101647273 A   2/2010
(Continued)

OTHER PUBLICATIONS

Extended European Search Report for European Application No. 14805026.3, Search completed Dec. 20, 2016, dated Jan. 3, 2017, 9 Pgs.
(Continued)

*Primary Examiner* — Le H Luu
(74) *Attorney, Agent, or Firm* — KPPB LLP (57) ABSTRACT

Systems and methods for synchronizing the playback of OTT or other time sensitive content on multiple playback devices is disclosed. The systems and methods include receiving time information based on a network time source in the playback devices. The playback clock in each playback device is set based upon the time information. Stream initiation information derived using the time information from the network time source is received by each of the playback device from the media provider. The playback devices use the stream initiation information to adjust the presentation time stamps of the frames of the media content in the stream.

18 Claims, 7 Drawing Sheets

Related U.S. Application Data continuation of application No. 16/111,662, filed on Aug. 24, 2018, now Pat. No. 10,523,984, which is a continuation of application No. 15/587,200, filed on May 4, 2017, now Pat. No. 10,063,896, which is a continuation of application No. 15/192,695, filed on Jun. 24, 2016, now Pat. No. 9,648,362, which is a continuation of application No. 13/906,952, filed on May 31, 2013, now Pat. No. 9,380,099.

(51) Int. Cl.
| | |
|---|---|
| *H04L 7/00* | (2006.01) |
| *H04N 21/242* | (2011.01) |
| *H04L 65/80* | (2022.01) |
| *H04L 65/61* | (2022.01) |
| *H04L 65/70* | (2022.01) |
| *H04L 65/75* | (2022.01) |

(52) U.S. Cl.
CPC ............ *H04L 65/70* (2022.05); *H04L 65/764* (2022.05); *H04L 65/80* (2013.01); *H04N 21/242* (2013.01); *H04N 21/4305* (2013.01); *H04N 21/4307* (2013.01); *H04N 21/43076* (2020.08)

(58) Field of Classification Search
CPC ............. H04N 21/2387; H04N 21/242; H04N 21/4305; H04N 21/4307; H04N 21/43076; H04N 21/23406; H04N 21/4143; H04N 21/4348; H04N 21/43615; H04N 5/073; G06F 3/165; H04W 56/001
See application file for complete search history.

(56) References Cited

U.S. PATENT DOCUMENTS

| | | |
|---|---|---|
| 5,600,721 A | 2/1997 | Kitazato |
| 5,621,794 A | 4/1997 | Matsuda et al. |
| 5,642,338 A | 6/1997 | Fukushima et al. |
| 5,805,700 A | 9/1998 | Nardone et al. |
| 5,813,010 A | 9/1998 | Kurano et al. |
| 5,854,873 A | 12/1998 | Mori et al. |
| 5,907,658 A | 5/1999 | Murase et al. |
| 5,923,869 A | 7/1999 | Kashiwagi et al. |
| 6,002,834 A | 12/1999 | Hirabayashi et al. |
| 6,009,237 A | 12/1999 | Hirabayashi et al. |
| 6,016,381 A | 1/2000 | Taira et al. |
| 6,057,832 A | 5/2000 | Lev et al. |
| 6,065,050 A | 5/2000 | DeMoney |
| 6,266,483 B1 | 7/2001 | Okada et al. |
| 6,282,320 B1 | 8/2001 | Hasegawa et al. |
| 6,320,905 B1 | 11/2001 | Konstantinides |
| 6,351,538 B1 | 2/2002 | Uz |
| 6,373,803 B2 | 4/2002 | Ando et al. |
| 6,415,031 B1 | 7/2002 | Colligan et al. |
| 6,445,877 B1 | 9/2002 | Okada et al. |
| 6,453,115 B1 | 9/2002 | Boyle |
| 6,453,116 B1 | 9/2002 | Ando et al. |
| 6,504,873 B1 | 1/2003 | Vehvilaeinen |
| 6,512,883 B2 | 1/2003 | Shim et al. |
| 6,594,699 B1 | 7/2003 | Sahai et al. |
| 6,654,933 B1 | 11/2003 | Abbott et al. |
| 6,671,408 B1 | 12/2003 | Kaku |
| 6,690,838 B2 | 2/2004 | Zhou |
| 6,724,944 B1 | 4/2004 | Kalevo et al. |
| 6,751,623 B1 | 6/2004 | Basso et al. |
| 6,813,437 B2 | 11/2004 | Ando et al. |
| 6,871,006 B1 | 3/2005 | Oguz et al. |
| 6,912,513 B1 | 6/2005 | Candelore |
| 6,931,531 B1 | 8/2005 | Takahashi |
| 6,957,350 B1 | 10/2005 | Demos |
| 6,970,564 B1 | 11/2005 | Kubota et al. |
| 6,983,079 B2 | 1/2006 | Kim |
| 7,006,757 B2 | 2/2006 | Ando et al. |
| 7,007,170 B2 | 2/2006 | Morten |
| 7,020,287 B2 | 3/2006 | Unger |
| 7,151,832 B1 | 12/2006 | Fetkovich et al. |
| 7,188,183 B1 | 3/2007 | Paul et al. |
| 7,212,726 B2 | 5/2007 | Zetts |
| 7,242,772 B1 | 7/2007 | Tehranchi |
| 7,246,367 B2 | 7/2007 | Iivonen |
| 7,274,861 B2 | 9/2007 | Yahata et al. |
| 7,295,673 B2 | 11/2007 | Grab et al. |
| 7,349,886 B2 | 3/2008 | Morten et al. |
| 7,352,956 B1 | 4/2008 | Winter et al. |
| 7,382,879 B1 | 6/2008 | Miller |
| 7,397,853 B2 | 7/2008 | Kwon et al. |
| 7,400,679 B2 | 7/2008 | Kwon et al. |
| 7,418,132 B2 | 8/2008 | Hoshuyama |
| 7,457,415 B2 | 11/2008 | Reitmeier et al. |
| 7,499,930 B2 | 3/2009 | Naka et al. |
| 7,546,641 B2 | 6/2009 | Robert et al. |
| 7,627,808 B2 | 12/2009 | Blank et al. |
| 7,639,921 B2 | 12/2009 | Seo et al. |
| 7,640,435 B2 | 12/2009 | Morten |
| 7,711,052 B2 | 5/2010 | Hannuksela et al. |
| 7,853,980 B2 | 12/2010 | Pedlow, Jr. et al. |
| 7,864,186 B2 | 1/2011 | Robotham et al. |
| 7,945,143 B2 | 5/2011 | Yahata et al. |
| 7,996,700 B2 | 8/2011 | Celinski et al. |
| 8,131,875 B1 | 3/2012 | Chen |
| 8,169,916 B1 | 5/2012 | Pai et al. |
| 8,243,924 B2 | 8/2012 | Chen et al. |
| 8,286,213 B2 | 10/2012 | Seo |
| 8,312,079 B2 | 11/2012 | Newsome et al. |
| 8,369,421 B2 | 2/2013 | Kadono et al. |
| 8,649,669 B2 | 2/2014 | Braness et al. |
| 8,683,066 B2 | 3/2014 | Hurst et al. |
| 8,782,268 B2 | 7/2014 | Pyle et al. |
| 8,819,116 B1 | 8/2014 | Tomay et al. |
| 8,849,950 B2 | 9/2014 | Stockhammer et al. |
| 9,038,116 B1 | 5/2015 | Knox et al. |
| 9,100,687 B2 | 8/2015 | Amidei |
| 9,380,099 B2 | 6/2016 | Amidei et al. |
| 9,432,718 B2 | 8/2016 | Amidei |
| 9,648,362 B2 | 5/2017 | Amidei et al. |
| 10,063,896 B2 | 8/2018 | Amidei et al. |
| 10,205,981 B2 | 2/2019 | Amidei |
| 10,523,984 B2 | 12/2019 | Amidei et al. |
| 10,880,620 B2 | 12/2020 | Amidei |
| 11,272,232 B2 | 3/2022 | Amidei et al. |
| 2001/0021276 A1 | 9/2001 | Zhou |
| 2001/0052077 A1 | 12/2001 | Fung et al. |
| 2001/0052127 A1 | 12/2001 | Seo et al. |
| 2002/0048450 A1 | 4/2002 | Zetts |
| 2002/0067432 A1 | 6/2002 | Kondo et al. |
| 2002/0135607 A1 | 9/2002 | Kato et al. |
| 2002/0141503 A1 | 10/2002 | Kobayashi et al. |
| 2002/0154779 A1 | 10/2002 | Asano et al. |
| 2002/0164024 A1 | 11/2002 | Arakawa et al. |
| 2002/0169971 A1 | 11/2002 | Asano et al. |
| 2003/0002577 A1 | 1/2003 | Pinder |
| 2003/0044080 A1 | 3/2003 | Frishman et al. |
| 2003/0053541 A1 | 3/2003 | Sun et al. |
| 2003/0063675 A1 | 4/2003 | Kang et al. |
| 2003/0077071 A1 | 4/2003 | Lin et al. |
| 2003/0135742 A1 | 7/2003 | Evans |
| 2003/0142594 A1 | 7/2003 | Tsumagari et al. |
| 2003/0206717 A1 | 11/2003 | Yogeshwar et al. |
| 2004/0001594 A1 | 1/2004 | Krishnaswamy et al. |
| 2004/0022391 A1 | 2/2004 | Obrien |
| 2004/0028227 A1 | 2/2004 | Yu |
| 2004/0037421 A1 | 2/2004 | Truman |
| 2004/0047592 A1 | 3/2004 | Seo et al. |
| 2004/0047607 A1 | 3/2004 | Seo et al. |
| 2004/0076237 A1 | 4/2004 | Kadono et al. |
| 2004/0081333 A1 | 4/2004 | Grab et al. |
| 2004/0093494 A1 | 5/2004 | Nishimoto et al. |
| 2004/0101059 A1 | 5/2004 | Joch et al. |
| 2004/0107356 A1 | 6/2004 | Shamoon et al. |
| 2005/0013494 A1 | 1/2005 | Srinivasan et al. |

(56) References Cited

U.S. PATENT DOCUMENTS

| | | |
|---|---|---|
| 2005/0063541 A1 | 3/2005 | Candelore |
| 2005/0076232 A1 | 4/2005 | Kawaguchi |
| 2005/0144468 A1 | 6/2005 | Northcutt |
| 2005/0166135 A1* | 7/2005 | Burke ............ H04N 21/23406 370/503 |
| 2005/0177741 A1 | 8/2005 | Chen et al. |
| 2005/0243912 A1 | 11/2005 | Kwon et al. |
| 2005/0265555 A1 | 12/2005 | Pippuri |
| 2006/0002681 A1* | 1/2006 | Spilo ............... H04N 21/4305 386/220 |
| 2006/0013568 A1 | 1/2006 | Rodriguez |
| 2006/0165163 A1 | 7/2006 | Burazerovic et al. |
| 2007/0047645 A1 | 3/2007 | Takashima |
| 2007/0067472 A1 | 3/2007 | Maertens et al. |
| 2007/0083467 A1 | 4/2007 | Lindahl et al. |
| 2007/0110074 A1 | 5/2007 | Bradley et al. |
| 2007/0180051 A1 | 8/2007 | Kelly et al. |
| 2007/0250761 A1 | 10/2007 | Bradley et al. |
| 2008/0086570 A1 | 4/2008 | Dey et al. |
| 2008/0101718 A1 | 5/2008 | Yang et al. |
| 2008/0137847 A1 | 6/2008 | Candelore et al. |
| 2008/0177822 A1 | 7/2008 | Yoneda |
| 2008/0270800 A1 | 10/2008 | Krober et al. |
| 2009/0010622 A1 | 1/2009 | Yahata et al. |
| 2009/0013195 A1 | 1/2009 | Ochi et al. |
| 2009/0077143 A1 | 3/2009 | Macy, Jr. |
| 2009/0106082 A1 | 4/2009 | Senti et al. |
| 2009/0129752 A1 | 5/2009 | Yamada et al. |
| 2009/0132599 A1 | 5/2009 | Soroushian et al. |
| 2009/0178090 A1 | 7/2009 | Oztaskent |
| 2009/0249081 A1 | 10/2009 | Zayas |
| 2009/0249222 A1* | 10/2009 | Schmidt ............. H04N 21/4143 713/400 |
| 2009/0282162 A1 | 11/2009 | Mehrotra et al. |
| 2009/0310819 A1 | 12/2009 | Hatano |
| 2010/0100917 A1 | 4/2010 | Chiao et al. |
| 2010/0111491 A1* | 5/2010 | Kamoto ............... H04N 5/073 386/207 |
| 2010/0142915 A1 | 6/2010 | Mcdermott et al. |
| 2011/0010466 A1 | 1/2011 | Fan et al. |
| 2011/0047247 A1* | 2/2011 | Katz ................. G06F 3/165 709/219 |
| 2011/0058675 A1 | 3/2011 | Brueck et al. |
| 2011/0096828 A1 | 4/2011 | Chen et al. |
| 2011/0103374 A1 | 5/2011 | Lajoie et al. |
| 2011/0110360 A1 | 5/2011 | Fenwick |
| 2011/0135090 A1 | 6/2011 | Chan et al. |
| 2011/0145858 A1 | 6/2011 | Philpott et al. |
| 2011/0173345 A1 | 7/2011 | Knox et al. |
| 2011/0179185 A1 | 7/2011 | Wang et al. |
| 2011/0197261 A1 | 8/2011 | Dong et al. |
| 2011/0218656 A1 | 9/2011 | Bishop et al. |
| 2011/0246661 A1 | 10/2011 | Manzari et al. |
| 2011/0276648 A1* | 11/2011 | Soldan ............... H04N 21/4305 709/208 |
| 2011/0296048 A1 | 12/2011 | Knox et al. |
| 2011/0314130 A1 | 12/2011 | Strasman |
| 2012/0005312 A1 | 1/2012 | Mcgowan et al. |
| 2012/0042047 A1 | 2/2012 | Chen et al. |
| 2012/0042090 A1 | 2/2012 | Chen et al. |
| 2012/0047542 A1 | 2/2012 | Lewis et al. |
| 2012/0082424 A1 | 4/2012 | Hubner et al. |
| 2012/0110120 A1 | 5/2012 | Willig et al. |
| 2012/0144435 A1 | 6/2012 | Spilo et al. |
| 2012/0167132 A1 | 6/2012 | Mathews et al. |
| 2012/0311174 A1 | 12/2012 | Bichot et al. |
| 2012/0331167 A1 | 12/2012 | Hunt |
| 2013/0013803 A1 | 1/2013 | Bichot et al. |
| 2013/0067116 A1 | 3/2013 | Ostergren |
| 2013/0080267 A1 | 3/2013 | McGowan |
| 2013/0128116 A1* | 5/2013 | Knowles ............ H04W 56/001 348/521 |
| 2014/0140253 A1 | 5/2014 | Lohmar et al. |
| 2014/0149557 A1 | 5/2014 | Lohmar et al. |
| 2014/0237086 A1* | 8/2014 | Legallais ........ H04N 21/43615 709/219 |
| 2014/0359075 A1 | 12/2014 | Amidei et al. |
| 2014/0359681 A1 | 12/2014 | Amidei |
| 2015/0179227 A1* | 6/2015 | Russell ............ H04N 21/4348 386/354 |
| 2015/0288530 A1 | 10/2015 | Oyman |
| 2015/0341683 A1 | 11/2015 | Amidei et al. |
| 2016/0302166 A1 | 10/2016 | Dang et al. |
| 2016/0309206 A1 | 10/2016 | Amidei et al. |
| 2016/0353143 A1 | 12/2016 | Amidei |
| 2017/0034263 A1 | 2/2017 | Archambault et al. |
| 2017/0238027 A1 | 8/2017 | Amidei et al. |
| 2018/0367824 A1 | 12/2018 | Amidei et al. |
| 2019/0238910 A1 | 8/2019 | Amidei |
| 2020/0137434 A1 | 4/2020 | Amidei et al. |

FOREIGN PATENT DOCUMENTS

| | | |
|---|---|---|
| CN | 102782669 A | 11/2012 |
| CN | 105247437 B | 1/2018 |
| CN | 108092973 A | 5/2018 |
| EP | 1453319 A1 | 9/2004 |
| EP | 1283640 B1 | 10/2006 |
| EP | 2180664 A1 | 4/2010 |
| EP | 2290899 A2 | 3/2011 |
| EP | 2360923 A1 | 8/2011 |
| EP | 3005013 A1 | 4/2016 |
| EP | 3005013 A4 | 1/2017 |
| EP | 3005013 B1 | 8/2018 |
| EP | 3462275 A1 | 4/2019 |
| HK | 1217049 A1 | 12/2016 |
| HK | 1250553 A | 12/2018 |
| HK | 1217049 B | 1/2019 |
| HK | 1262076 A1 | 1/2020 |
| JP | 2001091680 A | 4/2001 |
| JP | 2003085068 A | 3/2003 |
| JP | 2006101364 A | 4/2006 |
| JP | 2008252422 A | 10/2008 |
| JP | 2011223060 A | 11/2011 |
| JP | 2016526349 A | 9/2016 |
| JP | 2019050636 A | 3/2019 |
| JP | 6509826 B2 | 5/2019 |
| JP | 6783293 B2 | 10/2020 |
| KR | 20040039852 A | 5/2004 |
| KR | 20060106250 A | 10/2006 |
| KR | 20160021152 A | 2/2016 |
| KR | 1017481998 B1 | 6/2017 |
| RU | 2328040 C2 | 6/2008 |
| TW | 201246873 A | 11/2012 |
| WO | 2000049762 A2 | 8/2000 |
| WO | 2000049763 A1 | 8/2000 |
| WO | 2003047262 A2 | 6/2003 |
| WO | 2004012378 A2 | 2/2004 |
| WO | 2004100158 A1 | 11/2004 |
| WO | 2005008385 A2 | 1/2005 |
| WO | 2005015935 A1 | 2/2005 |
| WO | 2009006302 A1 | 1/2009 |
| WO | 2009109976 A2 | 9/2009 |
| WO | 2011087449 A1 | 7/2011 |
| WO | 2011101371 A1 | 8/2011 |
| WO | 2011103364 A1 | 8/2011 |
| WO | 2012021747 A1 | 2/2012 |
| WO | 2013045456 A1 | 4/2013 |
| WO | 2014194232 A1 | 12/2014 |
| WO | 2014194236 A2 | 12/2014 |
| WO | 2014194236 A3 | 5/2015 |

OTHER PUBLICATIONS

Extended European Search Report for European Application No. 18191099.3, Search completed Dec. 11, 2018, dated Jan. 7, 2019, 9 Pgs.

Information Technology—MPEG Systems Technologies—Part 7: Common Encryption in ISO Base Media File Format Files (ISO/IEC 23001-7), Apr. 2015, 24 pgs.

(56) References Cited

OTHER PUBLICATIONS

International Preliminary Report on Patentability for International Application PCT/US2014/040299, Report dated Dec. 1, 2015, dated Dec. 10, 2015, 06 Pgs.
International Preliminary Report on Patentability for International Application PCT/US2014/040308, Report dated Dec. 1, 2015, dated Dec. 10, 2015, 08 Pgs.
International Search Report and Written Opinion for International Application PCT/US2014/040308, Report Completed Sep. 10, 2014, dated Mar. 27, 2015, 9 pgs.
ISO/IEC 14496-12 Information technology—Coding of audio-visual objects—Part 12: ISO base media file format, Feb. 2004 ("MPEG-4 Part 12 Standard"), 62 pgs.
ISO/IEC 14496-12:2008(E) Informational Technology—Coding of Audio-Visual Objects Part 12: ISO Base Media File Format, Oct. 2008, 120 pgs.
ISO/IEC FCD 23001-6 MPEG systems technologies Part 6: Dynamic adaptive streaming over HTTP (DASH), Jan. 28, 2011, 86 pgs.
Microsoft Corporation, Advanced Systems Format (ASF) Specification, Revision 01.20.03, Dec. 2004, 121 pgs.
MPEG-DASH presentation at Streaming Media West 2011, Nov. 2011, 14 pgs.
Pomelo, LLC Tech Memo, Analysis of Netflix's Security Framework for 'Watch Instantly' Service, Mar.-Apr. 2009, 18 pgs.
Server-Side Stream Repackaging (Streaming Video Technologies Panorama, Part 2), Jul. 2011, 15 pgs.
Text of ISO/IEC 23001-6: Dynamic adaptive streaming over HTTP (DASH), Oct. 2010, 71 pgs.
Universal Mobile Telecommunications System (UMTS), ETSI TS 126 233 V9.1.0 (Jun. 2011) 3GPP TS 26.233 version 9.1.0 Release 9, 18 pgs.
Universal Mobile Telecommunications Systems (UMTS); ETSI TS 126 244 V9.4.0 (May 2011) 3GPP TS 26.244 version 9.4.0 Release 9, 58 pgs.
International Search Report and Written Opinion for International Application PCT/US2014/040299, report completed Sep. 8, 2014, dated Oct. 6, 2014, 7 pgs.
"Apple HTTP Live Streaming specification", Aug. 2017, 60 pgs.
"Data Encryption Decryption using AES Algorithm, Key and Salt with Java Cryptography Extension", Available at https://www.digizol.com/2009/10/java-encrypt-decrypt-jce-salt.html, Oct. 200, 6 pgs.
"Delivering Live and On-Demand Smooth Streaming", Microsoft Silverlight, 2009, 28 pgs.
"HTTP Based Adaptive Streaming over HSPA", Apr. 2011, 73 pgs.
"HTTP Live Streaming", Mar. 2011, 24 pgs.
"HTTP Live Streaming", Sep. 2011, 33 pgs.
"Information Technology—Coding of Audio Visual Objects—Part 2: Visual", International Standard, ISO/IEC 14496-2, Third Edition, Jun. 1, 2004, pp. 1-724. (presented in three parts).
"Java Cryptography Architecture API Specification & Reference", Available at https://docs.oracle.com/javase/1.5.0/docs/guide/security/CryptoSpec.html, Jul. 25, 2004, 68 pgs.
"Java Cryptography Extension, javax.crypto.Cipher class", Available at https://docs.oracle.eom/javase/1.5.0/docs/api/javax/crypto/Cipher.html, 2004, 24 pgs.
"JCE Encryption—Data Encryption Standard (DES) Tutorial", Available at https://mkyong.com/java/jce-encryption-data-encryption-standard-des-tutorial/, Feb. 25, 2009, 2 pgs.
"Live and On-Demand Video with Silverlight and IIS Smooth Streaming", Microsoft Silverlight, Windows Server Internet Information Services 7.0, Feb. 2010, 15 pgs.
"Microsoft Smooth Streaming specification", Jul. 22, 2013, 56 pgs.
"MPEG-2, Part 1, ISO/IEC 13818-1", Information technology—Generic Coding of Moving Pictures and Associated Audio: Systems, 161 pgs., Nov. 13, 1994.
"MPEG-4, Part 14, ISO/IEC 14496-14", Information technology—Coding of audio-visual objects, 18 pgs., Nov. 15, 2003.
"OpenDML AVI File Format Extensions Version 1.02", OpenDML AVI MJPEG File Format Subcommittee. Last revision: Feb. 28, 1996. Reformatting Sep. 1997, 42 pgs.
"Single-Encode Streaming for Multiple Screen Delivery", Telestream Wowza Media Systems, 2009, 6 pgs.
"The MPEG-DASH Standard for Multimedia Streaming Over the Internet", IEEE MultiMedia, vol. 18, No. 4, 2011, 7 pgs.
"Windows Media Player 9", Microsoft, Mar. 23, 2017, 3 pgs.
Abomhara et al., "Enhancing Selective Encryption for H.264/AVC Using Advanced Encryption Standard", International Journal of computer Theory and Engineering, Apr. 2010, vol. 2, No. 2, pp. 223-229.
Alattar et al., A.M. "Improved selective encryption techniques for secure transmission of MPEG video bit-streams", In Proceedings 1999 International Conference on Image Processing (Cat. 99CH36348), vol. 4, IEEE, 1999, pp. 256-260.
Antoniou et al., "Adaptive Methods for the Transmission of Video Streams in Wireless Networks", 2015, 50 pgs.
Apostolopoulos et al., "Secure Media Streaming and Secure Transcoding", Multimedia Security Technologies for Digital Rights Management, 2006, 33 pgs.
Asai et al., "Essential Factors for Full-Interactive VOD Server: Video File System, Disk Scheduling, Network", Proceedings of Globecom '95, Nov. 14-16, 1995, 6 pgs.
Beker et al., "Cipher Systems, The Protection of Communications", 1982, 40 pgs.
Bocharov et al, "Portable Encoding of Audio-Video Objects, The Protected Interoperable File Format (PIFF)", Microsoft Corporation, First Edition Sep. 8, 2009, 30 pgs.
Bulterman et al., "Synchronized Multimedia Integration Language (SMIL 3.0)", W3C Recommendation, Dec. 1, 2008, https://www.w3.org/TR/2008/REC-SMIL3-20081201/, 321 pgs. (presented in five parts).
Cahill et al., "Locally Adaptive Deblocking Filter for Low Bit Rate Video", Proceedings 2000 International Conference on Image Processing, Sep. 10-13, 2000, Vancouver, BC, Canada, 4 pgs.
U.S. Appl. No. 60/372,901, filed Apr. 17, 2002, 5 pgs.
Chaddha et al., "A Frame-work for Live Multicast of Video Streams over the Internet", Proceedings of 3rd IEEE International Conference on Image Processing, Sep. 19, 1996, Lausanne, Switzerland, 4 pgs.
Cheng, "Partial Encryption for Image and Video Communication", Thesis, Fall 1998, 95 pgs.
Cheng et al., "Partial encryption of compressed images and videos", IEEE Transactions on Signal Processing, vol. 48, No. 8, Aug. 2000, 33 pgs.
Cheung et al., "On the Use of Destination Set Grouping to Improve Fairness in Multicast Video Distribution", Proceedings of IEEE INFOCOM'96, Conference on Computer Communications, vol. 2, IEEE, 1996, 23 pgs.
Collet, "Delivering Protected Content, an Approach for Next Generation Mobile Technologies", Thesis, 2010, 84 pgs.
Diamantis et al., "Real Time Video Distribution using Publication through a Database", Proceedings SIBGRAPI'98. International Symposium on Computer Graphics, Image Processing, and Vision (Cat. No.98EX237), Oct. 1990, 8 pgs.
Dworkin, "Recommendation for Block Cipher Modes of Operation: Methods and Techniques", NIST Special Publication 800-38A, 2001, 66 pgs.
Fang et al., "Real-time deblocking filter for MPEG-4 systems", Asia-Pacific Conference on Circuits and Systems, Oct. 28-31, 2002, Bail, Indonesia, pp. 541-544.
Fecheyr-Lippens, "A Review of HTTP Live Streaming", Jan. 2010, 38 pgs.
Fielding et al., "Hypertext Transfer Protocol—HTTP1.1", Network Working Group, RFC 2616, Jun. 1999, 114 pgs.
Fukuda et al., "Reduction of Blocking Artifacts by Adaptive DCT Coefficient Estimation in Block-Based Video Coding", Proceedings 2000 International Conference on Image Processing, Sep. 10-13, 2000, Vancouver, BC, Canada, pp. 969-972.
Huang, U.S. Pat. No. 7,729,426, U.S. Appl. No. 11/230,794, filed Sep. 20, 2005, 143 pgs.
Huang et al., "Adaptive MLP post-processing for block-based coded images", IEEE Proceedings—Vision, Image and Signal Processing, vol. 147, No. 5, Oct. 2000, pp. 463-473.

(56) References Cited

OTHER PUBLICATIONS

Huang et al., "Architecture Design for Deblocking Filter in H.264/ JVT/AVC", 2003 International Conference on Multimedia and Expo., Jul. 6-9, 2003, Baltimore, MD, 4 pgs.
Jain et al., U.S. Appl. No. 61/522,623, filed Aug. 11, 2011, 44 pgs.
Jung et al., "Design and Implementation of an Enhanced Personal Video Recorder for DTV", IEEE Transactions on Consumer Electronics, vol. 47, No. 4, Nov. 2001, 6 pgs.
Kalva, Hari "Delivering MPEG-4 Based Audio-Visual Services", 2001, 113 pgs.
Kang et al., "Access Emulation and Buffering Techniques for Steaming of Non- Stream Format Video Files", IEEE Transactions on Consumer Electronics, vol. 43, No. 3, Aug. 2001, 7 pgs.
Kim et al., "A Deblocking Filter with Two Separate Modes in Block-Based Video Coding", IEEE transactions on circuits and systems for video technology, vol. 9, No. 1, 1999, pp. 156-160.
Kim et al., "Tree-Based Group Key Agreement", Feb. 2004, 37 pgs.
Laukens, "Adaptive Streaming—A Brief Tutorial", EBU Technical Review, 2011, 6 pgs.
Legault et al., "Professional Video Under 32-bit Windows Operating Systems", SMPTE Journal, vol. 105, No. 12, Dec. 1996, 10 pgs.
Li et al., "Layered Video Multicast with Retransmission (LVMR): Evaluation of Hierarchical Rate Control", Proceedings of IEEE INFOCOM'98, the Conference on Computer Communications. Seventeenth Annual Joint Conference of the IEEE Computer and Communications Societies. Gateway to the 21st Century, Cat. No. 98, vol. 3, 1998, 26 pgs.
List et al., "Adaptive deblocking filter", IEEE transactions on circuits and systems for video technology, vol. 13, No. 7, Jul. 2003, pp. 614-619.
Massoudi et al., "Overview on Selective Encryption of Image and Video Challenges and Perspectives", EURASIP Journal on Information Security, Nov. 2008, 18 pgs.
McCanne et al., "Receiver-driven Layered Multicast", Conference proceedings on Applications, technologies, architectures, and protocols for computer communications, Aug. 1996, 14 pgs.
Meier, "Reduction of Blocking Artifacts in Image and Video Coding", IEEE Transactions on Circuits and Systems for Video Technology, vol. 9, No. 3, Apr. 1999, pp. 490-500.
Nelson, "Smooth Streaming Deployment Guide", Microsoft Expression Encoder, Aug. 2010, 66 pgs.
Newton et al., "Preserving Privacy by De-identifying Facial Images", Carnegie Mellon University School of Computer Science, Technical Report, CMU-CS-03-119, Mar. 2003, 26 pgs.
O'Brien, U.S. Appl. No. 60/399,846, filed Jul. 30, 2002, 27 pgs.
O'Rourke, "Improved Image Decompression for Reduced Transform Coding Artifacts", IEEE Transactions on Circuits and Systems for Video Technology, vol. 5, No. 6, Dec. 1995, pp. 490-499.
Park et al., "A postprocessing method for reducing quantization effects in low bit-rate moving picture coding", IEEE Transactions on Circuits and Systems for Video Technology, vol. 9, No. 1, Feb. 1999, pp. 161-171.
Richardson, "H.264 and MPEG-4 Video Compression", Wiley, 2003, 306 pgs. (presented in 2 parts).
Schulzrinne et al., "Real Time Streaming Protocol (RTSP)", Internet Engineering Task Force, RFC 2326, Apr. 1998, 80 pgs.
Sima et al., "An Efficient Architecture for Adaptive Deblocking Filter of H.264 AVC Video Coding", IEEE Transactions on Consumer Electronics, vol. 50, No. 1, Feb. 2004, pp. 292-296.
Spanos et al., "Performance Study of a Selective Encryption Scheme for the Security of Networked, Real-Time Video", Proceedings of the Fourth International Conference on Computer Communications and Networks, IC3N'95, Sep. 20-23, 1995, Las Vegas, NV, pp. 2-10.
Srinivasan et al., "Windows Media Video 9: overview and applications", Signal Processing: Image Communication, 2004, 25 pgs.
Stockhammer, "Dynamic Adaptive Streaming over HTTP—Standards and Design Principles", Proceedings of the second annual ACM conference on Multimedia, Feb. 2011, pp. 133-145.
Timmerer et al., "HTTP Streaming of MPEG Media", Proceedings of Streaming Day, 2010, 4 pgs.
Tiphaigne et al., "A Video Package for Torch", Jun. 2004, 46 pgs.
Trappe et al., "Key Management and Distribution for Secure Multimedia Multicast", IEEE Transaction on Multimedia, vol. 5, No. 4, Dec. 2003, pp. 544-557.
Van Deursen et al., "On Media Delivery Protocols in the Web", 2010 IEEE International Conference on Multimedia and Expo, Jul. 19-23, 2010, 6 pgs.
Ventura, Guillermo Albaida "Streaming of Multimedia Learning Objects", AG Integrated Communication System, Mar. 2003, 101 pgs.
Waggoner, "Compression for Great Digital Video", 2002, 184 pgs.
Watanabem et al., "MPEG-2 decoder enables DTV trick plays", esearcher System LSI Development Lab, Fujitsu Laboratories Ltd., Kawasaki, Japan, Jun. 2001, 2 pgs.
Wiegand, "Joint Video Team (JVT) of ISO/IEC MPEG and ITU-T VCEG", Jan. 2002, 70 pgs.
Willig et al., U.S. Appl. No. 61/409,285, filed Nov. 2, 2010, 43 pgs.
Yang et al., "Projection-Based Spatially Adaptive Reconstruction of Block-Transform Compressed Images", IEEE Transactions on Image Processing, vol. 4, No. 7, Jul. 1995, pp. 896-908.
Yang et al., "Regularized Reconstruction to Reduce Blocking Artifacts of Block Discrete Cosine Transform Compressed Images", IEEE Transactions on Circuits and Systems for Video Technology, vol. 3, No. 6, Dec. 1993, pp. 421-432.
Yu et al., "Video deblocking with fine-grained scalable complexity for embedded mobile computing", Proceedings 7th International Conference on Signal Processing, Aug. 31-Sep. 4, 2004, pp. 1173-1178.
Zakhor, "Iterative Procedures for Reduction of Blocking Effects in Transform Image Coding", IEEE Transactions on Circuits and Systems for Video Technology, vol. 2, No. 1, Mar. 1992, pp. 91-95.

* cited by examiner

SYNCHRONIZING MULTIPLE OVER THE TOP STREAMING CLIENTS

CROSS-REFERENCE TO RELATED APPLICATIONS

This application is a continuation of U.S. application Ser. No. 16/729,102, entitled "Synchronizing Multiple Over the Top Streaming Clients" to Amidei et al., filed Dec. 27, 2019, which is a continuation of U.S. application Ser. No. 16/111,662, entitled "Synchronizing Multiple Over the Top Streaming Clients" to Amidei et al., filed Aug. 24, 2018 and issued on Dec. 31, 2019 as U.S. Pat. No. 10,523,984, which application is a continuation of U.S. application Ser. No. 15/587,200, entitled "Synchronizing Multiple over the Top Streaming Clients" to Amidei et al., filed May 4, 2017 and issued on Aug. 28, 2018 as U.S. Pat. No. 10,063,896, which application is a continuation of U.S. application Ser. No. 15/192,695, entitled "Synchronizing Multiple Over The Top Streaming Clients" to Amidei et al., filed Jun. 24, 2016 and issued on May 9, 2017 as U.S. Pat. No. 9,648,362, which application is a continuation of U.S. application Ser. No. 13/906,952, entitled "Synchronizing Multiple Over the Top Streaming Clients" to Amidei et al., filed May 31, 2013 and issued on Jun. 28, 2016 as U.S. Pat. No. 9,380,099, the disclosures of which are incorporated herein by reference in their entireties.

FIELD OF THE INVENTION

This invention relates to the playback of streamed media content by multiple playback devices. More particularly, this invention relates to synchronizing the playback of media content by multiple playback devices of Over The Top (OTT) or other presentation time sensitive media streamed over a network.

BACKGROUND OF THE INVENTION

The term streaming media describes the playback of media on a playback device, where the media is stored on a server and continuously sent to the playback device over a network during playback. For purposes of this discussion, media and/or encoded media are defined as data of a work that includes video, audio, pictures, or another type of presentation that may be displayed, played or in some other way presented by a playback device. Typically, the playback device stores a sufficient quantity of media in a buffer at any given time during playback to prevent disruption of playback due to the playback device completing playback of all the buffered media prior to receipt of the next portion of media. Adaptive bit rate streaming or adaptive streaming involves detecting the present streaming conditions (e.g. the user's network bandwidth and CPU capacity) in real time and adjusting the quality of the streamed media accordingly. Typically, the source media is encoded at multiple bit rates and the playback device or client switches between streaming the different encodings depending on available resources.

Adaptive streaming solutions typically utilize either Hypertext Transfer Protocol (HTTP), published by the Internet Engineering Task Force and the World Wide Web Consortium as RFC 2616, or Real Time Streaming Protocol (RTSP), published by the Internet Engineering Task Force as RFC 2326, to stream media between a server and a playback device. HTTP is a stateless protocol that enables a playback device to request a byte range within a file. HTTP is described as stateless, because the server is not required to record information concerning the state of the playback device requesting information or the byte ranges requested by the playback device in order to respond to requests received from the playback device. RTSP is a network control protocol used to control streaming media servers. Playback devices issue control commands, such as "play" and "pause", to the server streaming the media to control the playback of media files. When RTSP is utilized, the media server records the state of each client device and determines the media to stream based upon the instructions received from the client devices and the client's state.

In adaptive streaming systems, the source media is typically stored on a media server as a top level index file pointing to a number of alternate streams that contain the actual video and audio data. Each stream is typically stored in one or more container files. Different adaptive streaming solutions typically utilize different index and media containers. The Synchronized Multimedia Integration Language (SMIL) developed by the World Wide Web Consortium is utilized to create indexes in several adaptive streaming solutions including IIS Smooth Streaming developed by Microsoft Corporation of Redmond, Wash., and Flash Dynamic Streaming developed by Adobe Systems Incorporated of San Jose, Calif. HTTP Adaptive Bitrate Streaming developed by Apple Computer Incorporated of Cupertino, Calif. implements index files using an extended M3U playlist file (.M3U8), which is a text file containing a list of URIs that typically identify a media container file. The most commonly used media container formats are the MP4 container format specified in MPEG-4 Part 14 (i.e. ISO/IEC 14496-14) and the MPEG transport stream (TS) container specified in MPEG-2 Part 1 (i.e. ISO/IEC Standard 13818-1). The MP4 container format is utilized in IIS Smooth Streaming and Flash Dynamic Streaming. The TS container is used in HTTP Adaptive Bitrate Streaming.

Adaptive bitrate streaming performs adequately for playback of media content on a device. However, there is currently no viable way to synchronize the playback of streamed content on two or more playback devices such that there is no discernible difference between the presentation times of the content on the two or more devices. Currently, the only way to synchronize the device is for the user to manually control the start and stop of the playback on each of the devices to synchronize the playback which is often impossible or at least very difficult to achieve. Furthermore, the streaming of Over The Top (OTT) content or other presentation time sensitive content using adaptive bit rate streaming and other streaming processes is becoming more prevalent. OTT content is content that a media content provider delivers but may not have any control of the content and can only provide the content as it is received. The best example of OTT content is a live broadcast. During a live broadcast, the content is streamed directly to the playback devices to be played shortly after it is received in real time. Due to differences in the capabilities of playback devices and the network connections of the devices, the timing of receipt and playback of the streamed content on different devices may not be synchronized. As such, the manual synchronization is even more difficult than it is for synchronizing the playback of stored content on playback devices.

The lack of synchronization may be a problem when one or more devices are performing the playback within close proximity of one another as the lack of synchronization may be noticeable by viewers. For example, two or more playback devices may be set up in a restaurant to view a live sporting event. If the playback is not synchronized, the user may notice the broadcast delay between devices.

SUMMARY OF THE INVENTION

Systems and methods for synchronizing the playback of streamed OTT content or other time sensitive content in accordance with embodiments of this invention are disclosed. In accordance with embodiments of this invention, a method for playback of encoded media performed by a playback device be performed by the following actions. The playback device transmits a request to a network time provider. In response to the request, the playback device receives the time information from the network time provider. The playback device sets a playback clock in the device using the received time information. In order to provide a playback of a stream of content, the playback device receives stream initiation information for the stream of encoded media from a stream media provider. The stream initiation information includes a stream start time. The playback device then receives the stream of encoded media. The stream includes frames of the encoded content. The presentation time information of each of the frames of the stream is adjusted in the playback device based upon the stream initiation information.

In accordance with some embodiments of this invention the network time provider is a Network Time Protocol Server and the transmitting of the request and receiving of the time information are performed using Network Time Protocol (NTP). Furthermore, the time information and/or the start time is provided in Coordinated Universal Time in accordance with some embodiments this invention.

In accordance with some other embodiments of this invention, the network time provider is a local time server. In accordance with some of these embodiments, the local time server performs the following process to obtain time information. The local time server transmits a request for time information to a Network Time Protocol server. In response to the request, the local time server, receives the time information from the Network Time Protocol server in the local time server. The local time server then may receive the request for time information from the playback device. The local time server then generates the time information for the playback device from the timing information received from the Network Time Protocol server and transmits the time information to the playback device.

DETAILED DISCLOSURE OF THE INVENTION

Turning now to the drawings, systems and methods for synchronizing playback of OTT content by multiple clients is provided. In particular, embodiments of this invention can use time information from a common source to set the playback clocks in the individual playback devices. The playback devices then receive start time information from a media content provider that indicate the time for the start of playback. The start time information is determined using the time information from the common source. Each device then adjusts the presentation time stamps of the frames in the received content based on the received start time information.

Streaming System Architecture

Figure 1:
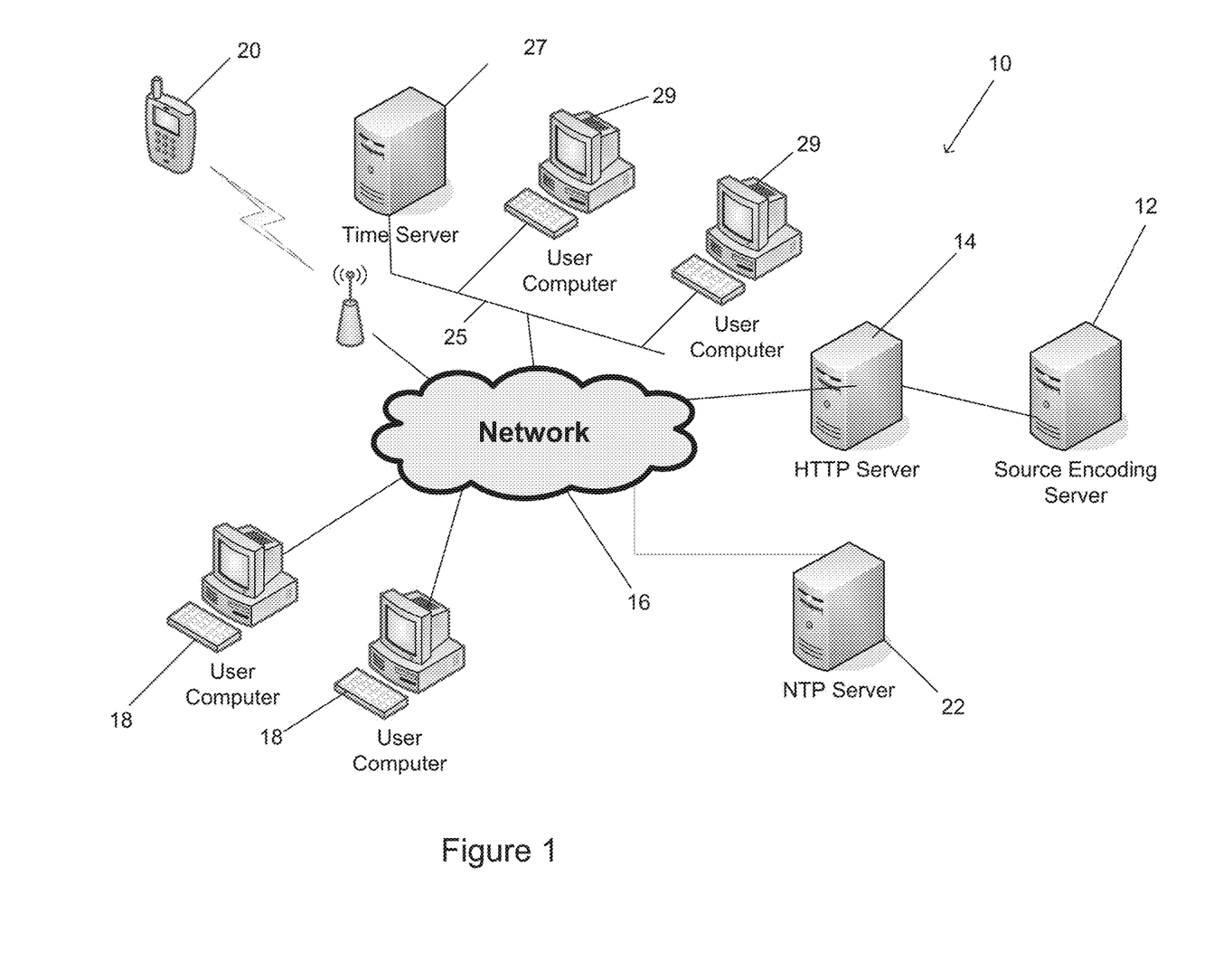
FIG. 1 illustrates a network diagram of a media streaming system in accordance with an embodiment of the invention.

Turning now to the FIG. 1, an adaptive streaming system in accordance with an embodiment of the invention is illustrated. The adaptive streaming system 10 includes a source encoder 12 configured to encode source media as a number of alternative streams. In the illustrated embodiment, the source encoder is a server. In other embodiments, the source encoder can be any processing device including a processor and sufficient resources to perform the transcoding of source media (including but not limited to video, audio, and/or subtitles). Typically, the source encoding server 12 generates a top level index to a plurality of container files containing the streams, at least a plurality of which are alternative streams. Alternative streams are streams that encode the same media content in different ways. In many instances, alternative streams encode media content (such as but not limited to video) at different maximum bitrates. In a number of embodiments, the alternative streams are encoded with different resolutions and/or at different frame rates. The top level index file and the container files are uploaded to an HTTP server 14. A variety of playback devices can then use HTTP or another appropriate stateless protocol to request portions of the top level index file and the container files via a network 16 such as the Internet.

Time server 22 is a server that provides Coordinated Universal Time (UTC) or equivalent information. In the shown embodiment, the time server 22 is a Network Time Protocol (NTP) server or an equivalent system that may be maintained by a third party. The use of NTP allows the time server 22 to provide time information to the devices allow internal clocks in the individual devices that are set using the time information to be synchronized within tens (10 s) of milliseconds (ms) of one another.

In the illustrated embodiment, playback devices include personal computers 18, CE players, and mobile phones 20. In other embodiments, playback devices can include consumer electronics devices such as DVD players, Blu-ray players, televisions, set top boxes, video game consoles, tablets, and other devices that are capable of connecting to a server via HTTP and playing back encoded media. Although a specific architecture is shown in FIG. 1, any of a variety of architectures including systems that perform conventional streaming and not adaptive bitrate streaming can be utilized that enable playback devices to request portions of the top level index file and the container files in accordance with embodiments of the invention.

As illustrated, some playback devices, such as user computers 29, are connected to the network 16 via a Local Area Network (LAN) 25. LAN 25 may include a local time server 27. Local time server 27 receives time information from the NTP server 22 and generates local time information based upon the time information received from the NTP server 22. Although shown as a server, one skilled in the art will recognize that any device connected to LAN 25 that can provide time information may be used without departing from embodiments of this invention. The local time information of local time server 27 may be provided to the playback devices connected to the LAN 25 to ensure that better time synchronization between the connected devices. The use of local time server 27 connected to the LAN 25 may be used when a synchronization of less than the 10 s of ms achieved using network time server 22 is desired. Network time servers, playback devices, and local time servers in accordance with embodiments of the invention are discussed further below.

Playback Device

Figure 2:
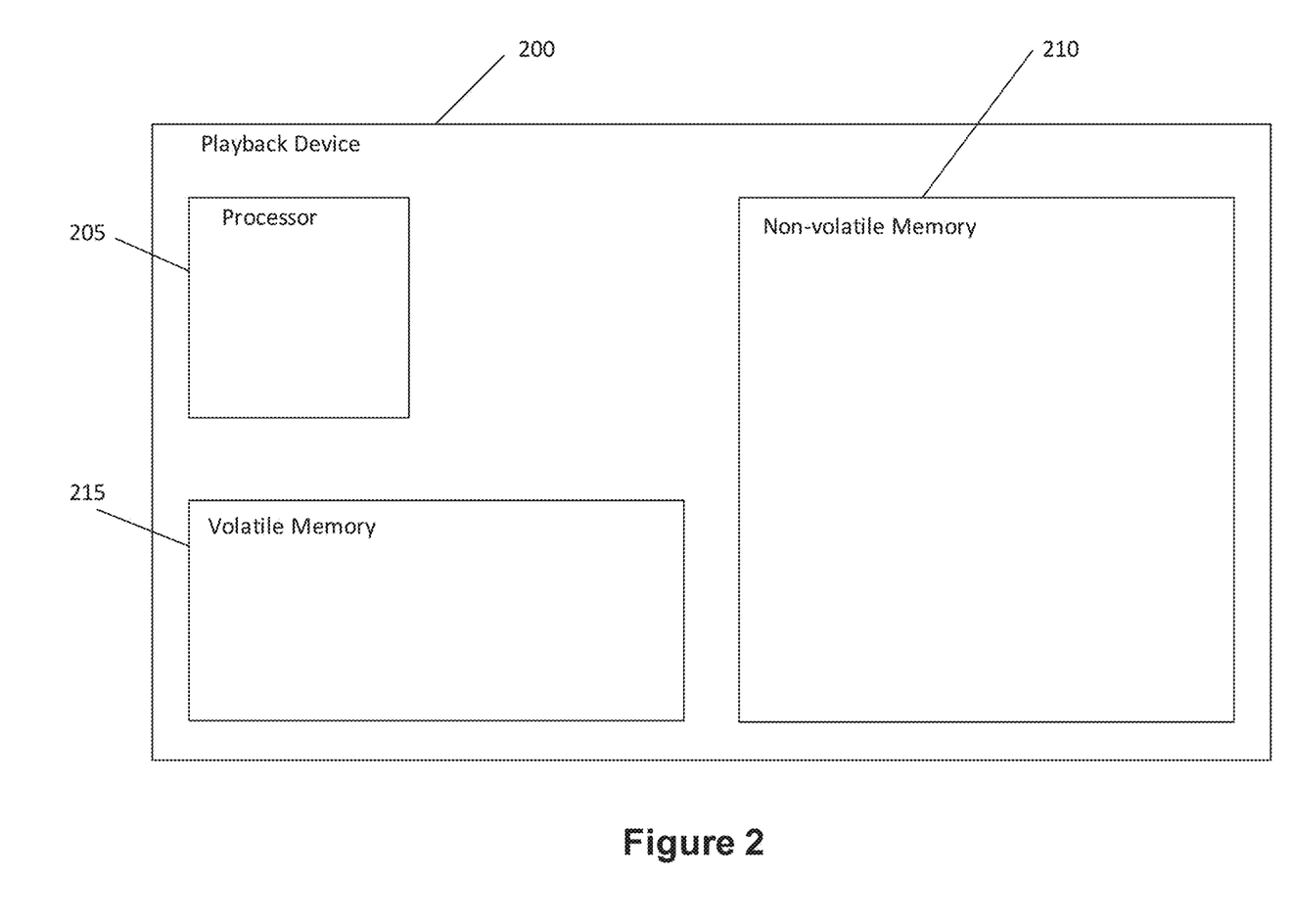
FIG. 2 illustrates a block diagram of components of a playback device that performs processes for providing systems and methods in accordance with an embodiment of this invention.

Some processes for providing methods and systems in accordance with embodiments of this invention are executed by a playback device. The relevant components in a playback device that can perform the processes in accordance with an embodiment of the invention are shown in FIG. 2. One skilled in the art will recognize that playback device may include other components that are omitted for brevity without departing from this invention. The playback device 200 includes a processor 205, a non-volatile memory 210, and a volatile memory 215. The processor 205 is a processor, microprocessor, controller, or a combination of processors, microprocessor, and/or controllers that performs instructions stored in the volatile 215 or non-volatile memory 210 to manipulate data stored in the memory. The non-volatile memory 210 can store the processor instructions utilized to configure the playback device 200 to perform processes including processes in accordance with embodiments of the invention and/or data for the processes being utilized. In other embodiments, the playback device software and/or firmware can be stored in any of a variety of non-transitory computer readable media appropriate to a specific application.

Servers

Figure 3:
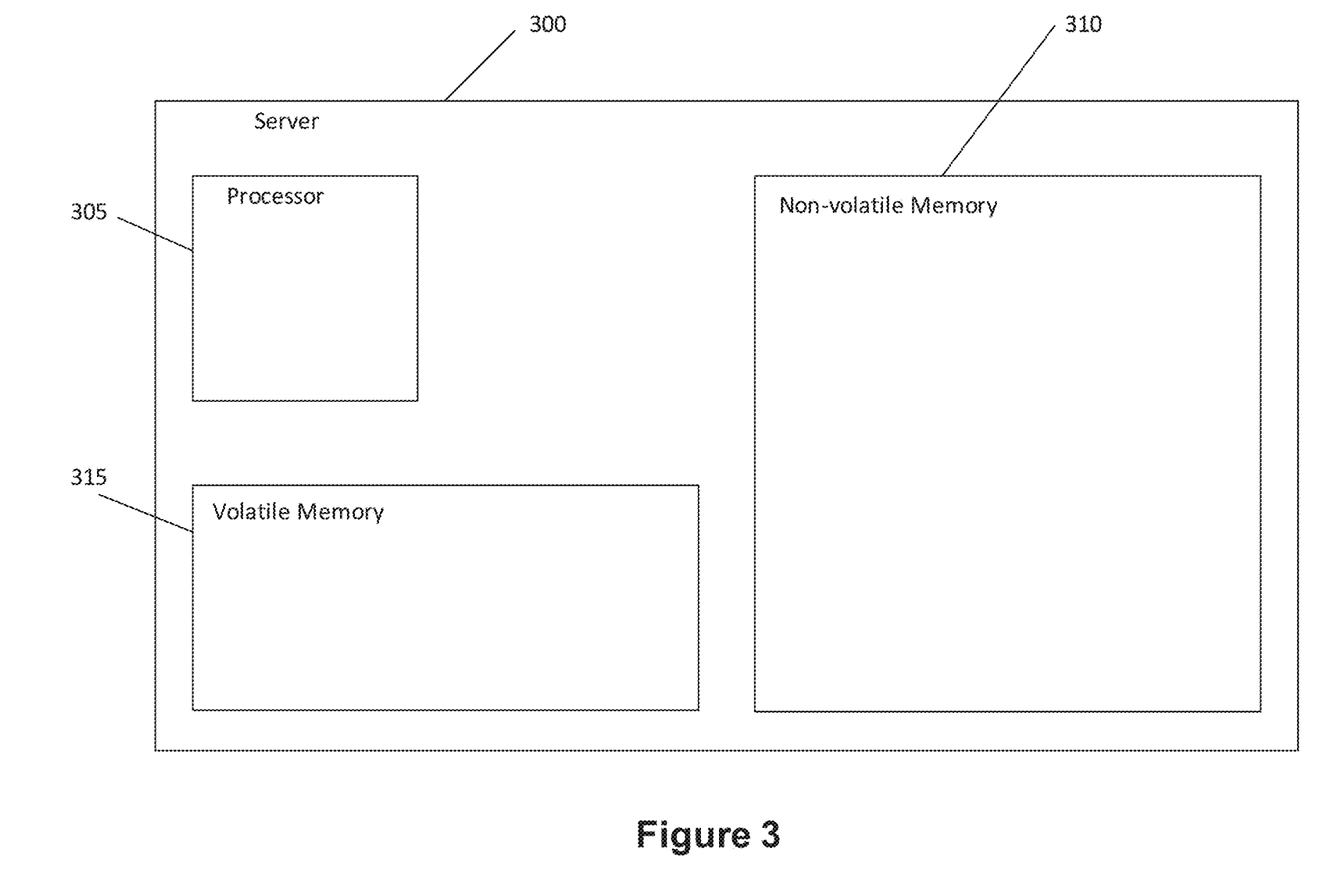
FIG. 3 illustrates a block diagram components of a server that performs processes for providing systems and methods in accordance with an embodiment of this invention.

Some processes for providing methods and systems in accordance with embodiments of this invention are executed by the HTTP server; source encoding server; and/or local and network time servers. The relevant components in a server that perform the processes in accordance with embodiments of the invention are shown in FIG. 3. One skilled in the art will recognize that a server may include other components that are omitted for brevity without departing from the embodiments of this invention. The server 300 includes a processor 305, a non-volatile memory 310, and a volatile memory 315. The processor 305 is a processor, microprocessor, controller, or a combination of processors, microprocessor, and/or controllers that performs instructions stored in the volatile 315 or non-volatile memory 310 to manipulate data stored in the memory. The non-volatile memory 310 can store the processor instructions utilized to configure the server 300 to perform processes including processes in accordance with embodiments of the invention and/or data for the processes being utilized. In other embodiments, the server software and/or firmware can be stored in any of a variety of non-transitory computer readable media appropriate to a specific application. Although a specific server is illustrated in FIG. 3, any of a variety of server configured to perform any number of processes can be utilized in accordance with embodiments of the invention.

Playback Synchronization

In accordance with embodiments of this invention, playback devices obtain time information from a common source and use the time information to set the playback clock of the devices. The playback devices also receive playback time information from the stream content provider. The playback time information is then used to adjust the presentation time of frames in the stream based upon the playback clock. Since the playback clocks have been set based upon time information from a common source there should by less than 10 s of ms delay between the presentations. A timing diagram of messages and information passed between devices over a network in accordance some embodiments of this invention is illustrated in FIG. 4.

Figure 4:
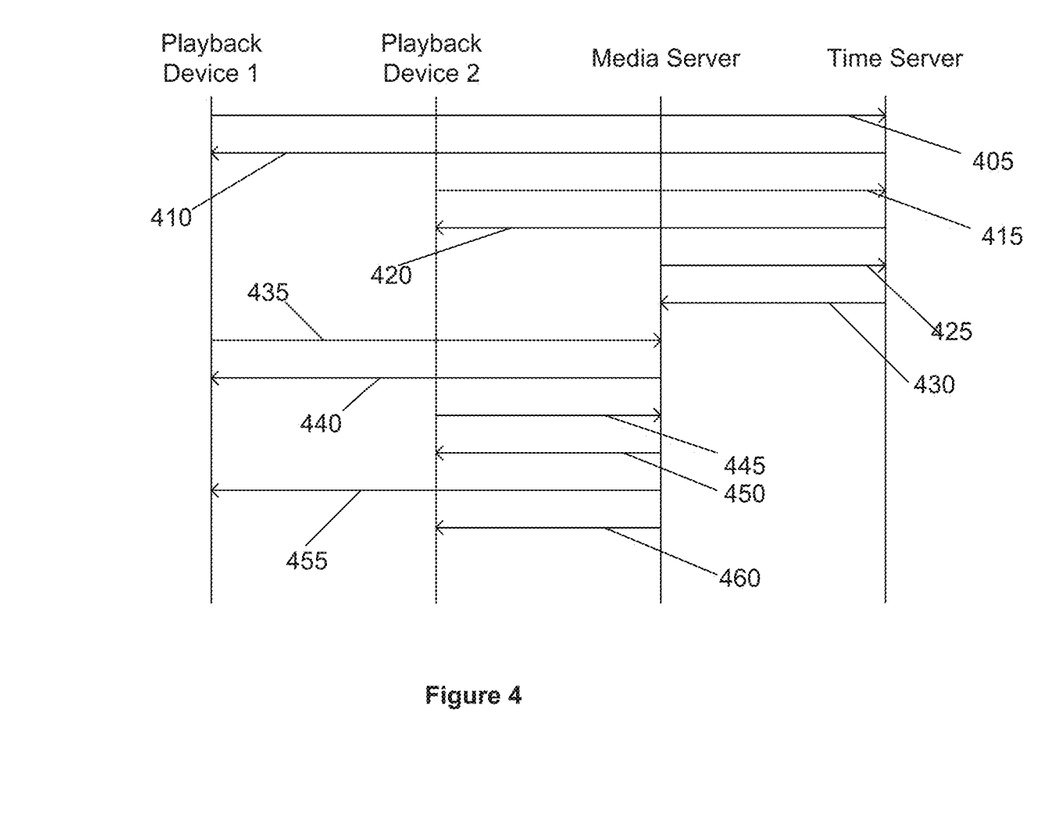
FIG. 4 illustrates a timing diagram of information transmitted between devices over a network in accordance with some embodiments of this invention.

In FIG. 4, the devices include a first playback device, a second playback device, a media server, and a network time server. The first and second playback devices are devices capable of presenting streamed encoded media content. The media server is a system that is providing the streamed content over the network to the first and second playback devices. The network time server is a time server that provides time information. In accordance with some embodiments, the time information is provided using NTP. Furthermore, the time information provides time information based upon Coordinated Universal Time (UTC).

In accordance with the timing diagram of FIG. 4, the first playback device transmits a request 405 to the time server for time information and receives time information 410 from the time server in response to the request. Likewise, the second playback device transmits a request 415 to the time server for time information and receives time information 420 from the time server in response to the request. Furthermore, the media server also transmits a time information request 425 to the time server and receives time information 430 from the time server in response to the request. In accordance with some embodiments, these exchanges are performed using NTP. However, other means for performing these exchanges of messages may be used without departing from embodiments of this invention. Furthermore, one skilled in the art will recognize that devices do not need to receive the time information from the same time server as long as the time information provided by the different time servers is generated from a common source. One skilled in the art will recognize that due to the network bandwidth and configuration of the networks connected to the devices that some delay may be introduced between the time information provided to the various devices by the time server.

The first and second playback devices use the time information received to set the respective playback clocks in each playback device. The first playback device transmits a request 435 for OTT content or other presentation time sensitive content to the media server. The media server transmits stream initiation information for a stream of encoded media for the desired content 440 to the first playback device. Similarly, the second device transmits a request 445 for the same OTT content or other presentation for time sensitive content to the media server. The media server transmits stream initiation information for a stream of encoded media for the desired content 450 to the second playback device. In accordance with some embodiments, the stream initiation information includes a start time based on the UTC.

The media server then commences transmitting streams of the media content 455 and 460 to each of the first and second playback devices. Each of the first and second devices then adjusts the Presentation Time Stamp (PTS) of each frame received in the stream of media content based upon stream initiation information. In accordance with some of these embodiments, the start time in the stream will be based upon the playback clock derived from UTC and the UTC of the start time. Since the start time of the stream is derived from the UTC and the playback clock is derived from the UTC, the delay between the presentations will be in the 10 s of ms based on the difference of time information received by the various devices.

In some embodiments, it may be desirable to have the synchronization of playback of the content include less than 10 s of ms of delay. This may be the case where devices are providing playback of the content in close proximity to one another. A timing diagram of a system that provides for greater synchronization between playback devices in accordance with some embodiments of this invention is shown in FIG. 5.

Figure 5:
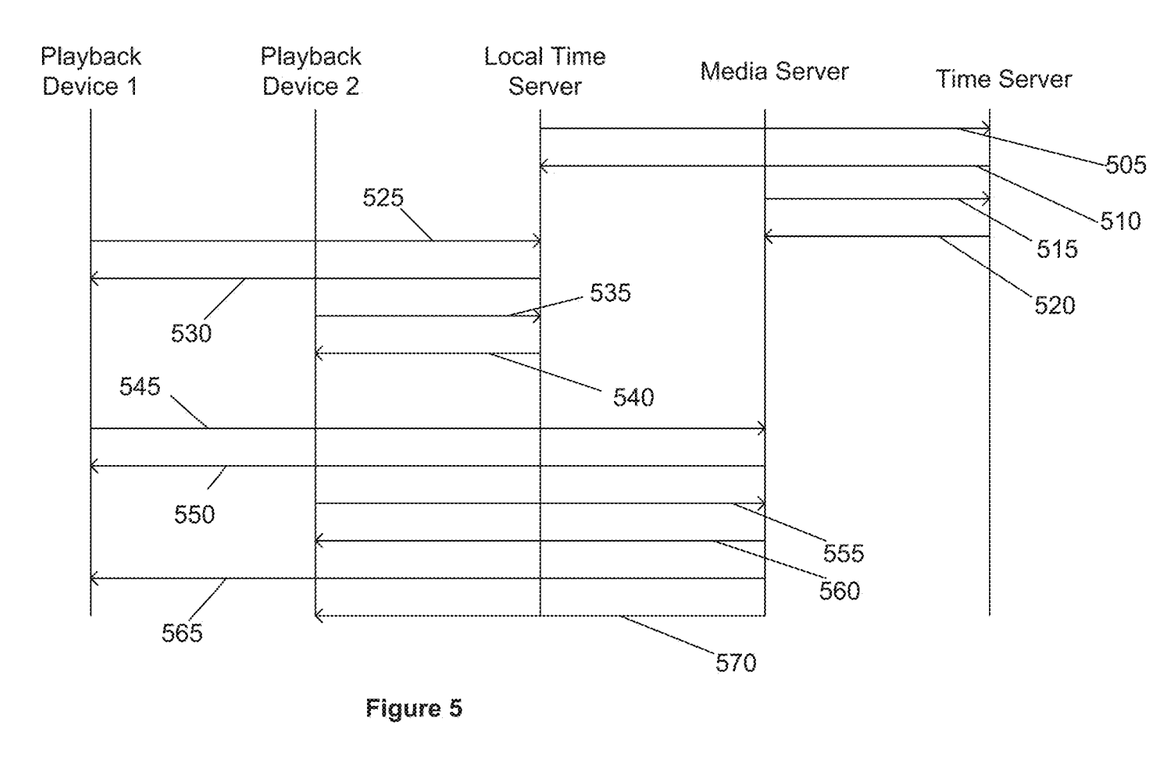
FIG. 5 illustrates a timing of information transmitted between devices over a network in accordance with other embodiments of this invention.

The system in FIG. 5 includes a first playback device, a second playback device, a local time server, a media server, and a network time server. The first and second playback devices are devices capable of presenting streamed encoded media content and each of these devices is connected to a LAN. The LAN includes a local time server. The local time server is a server that provides time information to devices connected to the LAN. In accordance with these embodiments, the time information is based upon time information received from a network time server as explained further below. The media server is a system that is providing the streamed content over the network to the first and second playback devices. The network time server is a time server that provides time information. In accordance with some embodiments, the time information is provided using NTP. Furthermore, the time information provides time information specified in terms of UTC.

In accordance with the timing diagram of FIG. 4, the local time server transmits a request 505 for time information to the network time server and receives the time information 510 from the time server in response. The media server also transmits a time information request 515 to the time server and receives time information 520 from the time server in response to the request. In accordance with some embodiments, these exchanges are performed using NTP. However, other means for performing these exchanges of messages may be used without departing from embodiments of this invention. Furthermore, one skilled in the art will recognize that servers do not need to receive the time information from the same time server as long as the time information provided by the different time servers is generated from a common source. One skilled in the art will also recognize that due to the network bandwidth and configuration of the networks connected to the servers that some delay may be introduced between the time information provided to the various devices by the time server.

The local time server then uses the time information to generate time information for use by the playback devices connected to the LAN. The first playback device transmits a request 525 to the local time server for time information and receives time information 530 from the local time server in response to the request. Likewise, the second playback device transmits a request 535 to the local time server for information and receives time information 540 from the local time server in response to the request. The first and second playback devices use the time information received to set the respective playback clocks in each device. As the time information is received over a LAN from the local server, there is less delay introduced into the time information. Thus, the playback clocks of the first and second playback devices will be more closely synchronized.

To start playback, the first device transmits a request 545 for OTT content or other presentation time sensitive content to the media server. The media server transmits stream initiation information for a stream of encoded media for the desired content 550 to the first playback device. Similarly, the second device transmits a request 555 for the same OTT content or other presentation for time sensitive content to the media server. The media server transmits stream initiation information for a stream of encoded media for the desired content 560 to the second playback device. In accordance with some embodiments, the stream initiation information includes a start time based on the UTC.

The media server then commences transmitting streams of the media content 565 and 570 to each of the first and second playback devices. Each of the first and second devices then adjusts the Presentation Time Stamp (PTS) of each frame received in the stream of media content based upon stream initiation information. In accordance with some of these embodiments, the start time in the stream will be based upon the playback clock derived from UTC information received from the local time server and the UTC of the start time. Since the start time of the stream is derived from the UTC and the playback clock is derived from the UTC received from the local time server instead of the network time server, the delay between the presentations will typically be less than the 10 s of ms of the system described above in reference to FIG. 4. This is because the internal clocks of the individual playback devices are more closely synchronized due to the lack of latency between the individual playback devices and the local time server of the LAN.

Figure 6:
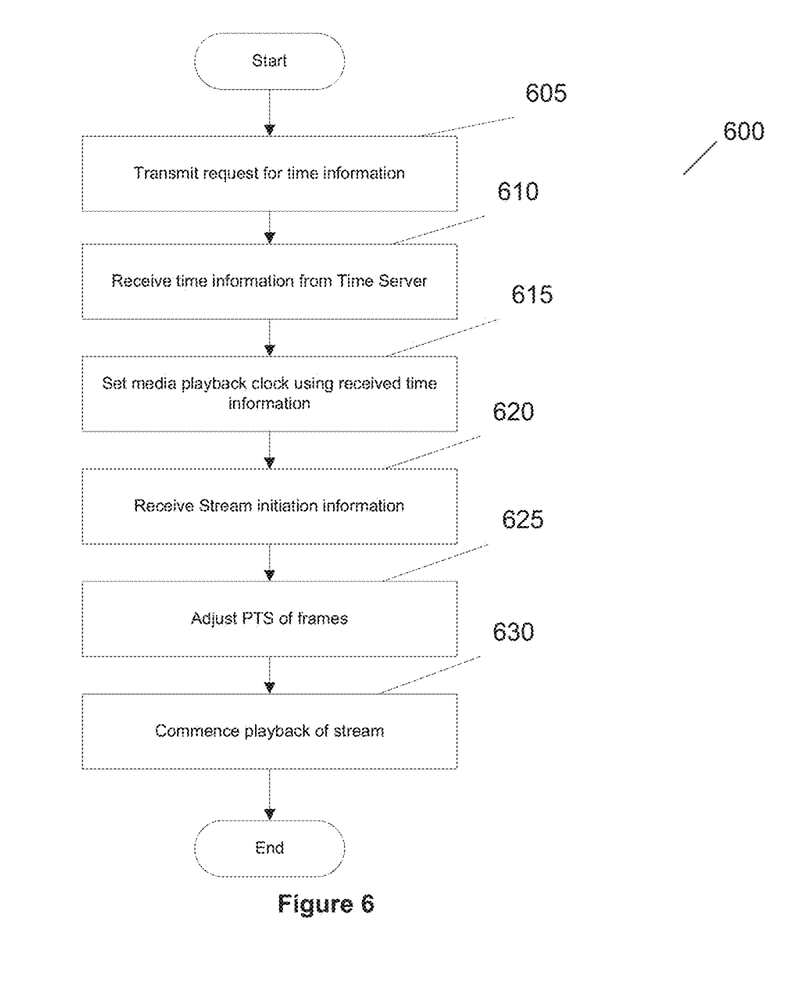
FIG. 6 illustrates a flow diagram of a process performed by a playback device in accordance with embodiments of this invention.

A process performed by a playback device to provide synchronized playback in accordance with some embodiments of this invention is illustrated in FIG. 6. The process 600 includes transmitting a request for time information to a time provider (605). As discussed with reference to FIGS. 4 and 5, the time provider may be, but is not limited to, a network time server and/or a local time server. The device receives time information from the time provider (610). The time information is preferably based upon the UTC. The time information is used by the playback device to set a media playback clock (615).

When the playback device plays back OTT or other presentation time content, the playback device receives stream initiation information (620). In accordance with some embodiments, the stream initiation information may be in the top level index of the requested content or provided along with some other type of administrative information such as metadata or the like. In accordance with some embodiments, the stream initiation information includes a start time based on the UTC. The playback device then receives the stream of media content. As the stream is received, the playback device adjusts the presentation time information of each frame based upon the stream initiation information and the playback clock (625). The presentation time information may be the Presentation Time Stamp (PTS) of a frame, PTS of a reference frame for a frame, or any other information that may be used to determine the time at which a frame may be presented. In accordance with some of these embodiments, the start time and the time of the playback clock are used to adjust the PTS of each frame. In particular, the difference between the start time received from the media server and the playback clock may be used to adjust the PTS of each frame. The playback of the stream then commences (630).

Figure 7:
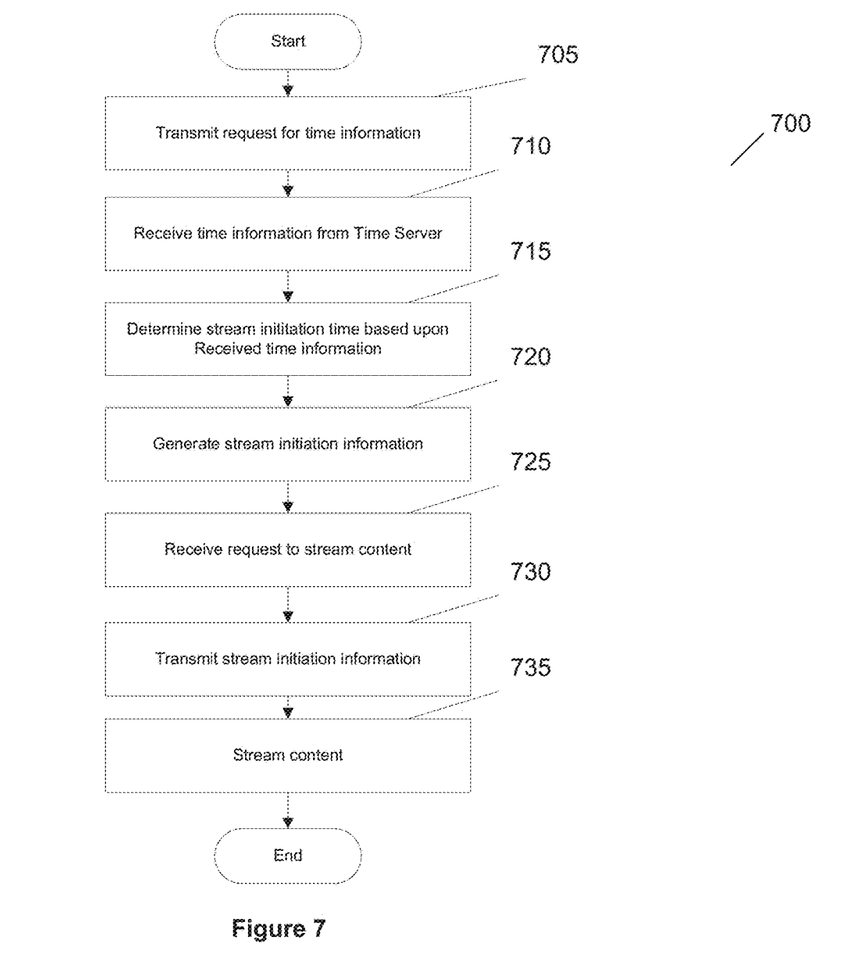
FIG. 7 illustrates a flow diagram of a process performed by a stream content provider in accordance with embodiments of this invention.

A process for providing stream initiation time information performed by a media server in accordance with embodiments of this invention is illustrated in FIG. 7. Process 700 includes transmitting a request for time information to a network time provider (705). As discussed with reference to FIGS. 4 and 5, the time provider may be, but is not limited to, a network time server. The media receives time information from the time provider (710). The time information is preferably based upon the UTC. The time information is used by the media server to determine a stream initiation time (715). As discussed above, the stream initiation time may be a start time that is based upon the UTC.

The stream initiation time is then used to generate stream initiation information for the stream of content (720). When a request for a stream of the content is received (725), the stream initiation information is provided to the requesting playback device (730) and the content is streamed to the playback device (735).

The above is description of embodiments of systems and methods in accordance with the present invention. It is foreseen that other skilled in the art will design alternative systems that infringe on this invention as set forth in the following claims either literally or through the Doctrine of Equivalents.

What is claimed is:

1. A method for using a media server to provide encoded media to a plurality of playback devices, the method comprising:
   receiving time information from a time provider;
   determining a stream start time based on the time information, the stream start time indicating a time for a start of playback;
   generating stream initiation information for a stream of encoded media, wherein the stream initiation information comprises the stream start time;
   providing the stream initiation information to each of the plurality of playback devices in response to receiving a request from each of the plurality of playback devices for the stream of encoded media; and
   providing the stream of encoded media to each of the plurality of playback devices, wherein the stream of encoded media includes a plurality of frames, wherein each frame of the plurality of frames is associated with a presentation time stamp, the presentation time stamp configured to be adjustable based on the stream initiation information, and wherein playback of the stream of encoded media is capable of synchronization between each of the plurality of playback devices based on the stream initiation information and a playback clock of each playback device.

2. The method of claim 1, wherein each of the plurality of playback devices comprises a synchronized playback clock.

3. The method of claim 2, wherein the playback clocks of each playback device are synchronized.

4. The method of claim 1, wherein the time provider comprises a Network Time Protocol Server.

5. The method of claim 1, wherein the stream start time is provided in Coordinated Universal Time.

6. The method of claim 1, further comprising transmitting a request for time information to the time provider.

7. A system for providing encoded media to a plurality of playback devices, the system comprising:
   memory; and
   a processor configured via a client application stored in the memory to:
   receive time information from a time provider;
   determine a stream start time based on the time information, the stream start time indicating a time for a start of playback;
   generate stream initiation information for a stream of encoded media, wherein the stream initiation information includes the stream start time;
   provide the stream initiation information to each of the plurality of playback devices in response to receiving a request from each of the plurality of playback devices for the stream of encoded media; and
   provide the stream of encoded media to each of the plurality of playback devices, wherein the stream of encoded media includes a plurality of frames, wherein each frame of the plurality of frames is associated with a presentation time stamp, the presentation time stamp configured to be adjustable based on the stream initiation information, and wherein playback of the stream of encoded media is capable of synchronization between each of the plurality of playback devices based on the stream initiation information and a playback clock of each playback device.

8. The system of claim 7, wherein each of the plurality of playback devices comprises a synchronized playback clock.

9. The system of claim 8, wherein the playback clocks of each playback device are synchronized.

10. The system of claim 7, wherein the time provider comprises a Network Time Protocol Server.

11. The system of claim 7, wherein the stream start time is provided in Coordinated Universal Time.

12. The system of claim 7, wherein the processor is further configured to transmit a request for time information to the time provider.

13. A non-transitory machine readable medium containing processor instructions, where execution of the instructions by a processor causes the processor to perform a process for providing encoded media to a plurality of playback devices, the process comprising:
   receiving time information from a time provider;
   determining a stream start time based on the time information, the stream start time indicating a time for a start of playback;
   generating stream initiation information for a stream of encoded media, wherein the stream initiation information includes the stream start time;
   providing the stream initiation information to each of the plurality of playback devices in response to receiving a request from each of the plurality of playback devices for the stream of encoded media; and
   providing the stream of encoded media to each of the plurality of playback devices, wherein the stream of encoded media includes a plurality of frames, wherein each frame of the plurality of frames is associated with a presentation time stamp, the presentation time stamp configured to be adjustable based on the stream initiation information, and wherein playback of the stream of encoded media is capable of synchronization between each of the plurality of playback devices based on the stream initiation information and a playback clock of each playback device.

14. The process of claim 13, wherein each of the plurality of playback devices comprises a synchronized playback clock.

15. The process of claim 14, wherein the playback clocks of each playback device are synchronized.

16. The process of claim 13, wherein the time provider comprises a Network Time Protocol Server.

17. The process of claim 13, wherein the stream start time is provided in Coordinated Universal Time.

18. The process of claim 13, further comprising transmitting a request for time information to the time provider.

* * * * *